(12) United States Patent
Do

(10) Patent No.: US 6,325,428 B1
(45) Date of Patent: *Dec. 4, 2001

(54) LATCH ASSEMBLY INCLUDING SENSOR

(75) Inventor: Thai Thanh Do, Laguna Niguel, CA (US)

(73) Assignee: Hartwell Corporation, Placentia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/437,880

(22) Filed: Nov. 10, 1999

(51) Int. Cl.[7] .................................................. E05C 5/00
(52) U.S. Cl. ............................. 292/113; 244/129.4
(58) Field of Search ................................. 292/113, 247, 292/250, 97, 256.69, 256; 244/129.4

(56) References Cited

U.S. PATENT DOCUMENTS

| | | | |
|---|---|---|---|
| 3,194,595 | * 7/1965 | Wheeler | 292/113 |
| 3,259,412 | * 7/1966 | Wheeler | 292/113 |
| 3,347,578 | * 10/1967 | Sheehan | 292/113 |
| 4,318,557 | 3/1982 | Bourne et al. | |
| 4,613,099 | * 9/1986 | Smith | 244/53 R |
| 4,759,574 | * 7/1988 | James | 292/113 |
| 5,152,559 | 10/1992 | Henrichs | |
| 5,518,206 | * 5/1996 | Arnold | 244/604 |
| 6,042,156 | * 3/2000 | Jackson | 292/26 |
| 6,148,607 | * 11/2000 | Baudu | 60/226.2 |

* cited by examiner

Primary Examiner—Gary Estremsky
(74) Attorney, Agent, or Firm—Barnes & Thornburg

(57) ABSTRACT

Disclosed is a latch assembly including sensor for releasably engaging an aircraft panel to a keeper. The latch assembly includes a latch housing and a latch mounted in the latch housing. The latch includes a hook rotatably mounted to the latch housing, and a linkage, moveable into and out of a locked position, rotatably mounted to the latch housing and the hook. The latch also includes a sensor, moveable between a blocking and unblocking position, mounted to the hook. In the blocking position, the sensor prevents the linkage from moving to its locked position and the latch assembly from closing. In the unblocking position, the sensor is moved away from the linkage allowing the linkage to move to its locked position and the latch assembly to close.

17 Claims, 5 Drawing Sheets

LATCH ASSEMBLY INCLUDING SENSOR

BACKGROUND OF THE INVENTION

1. Field of the Invention

This invention relates to the mechanical arts. In particular, this invention relates to a latch assembly including sensor that releasably engages a keeper for securing an aircraft panel to an aircraft structure.

2. Discussion of the Related Art

Various types of latches join and lock aircraft panels, such as an aircraft cowling, to an aircraft structure. A typical latch includes a hook mounted to an aircraft cowling that engages a keeper mounted to the aircraft structure. Sometimes, the latch is located at ground level and includes a handle directly connected to the hook such that the latch is directly operable by a latch operator. However, oftentimes the latch is located far above the ground and is not directly operable by a latch operator.

For example, cowlings are sometimes secured to the aircraft structure at the top of the cowling, near the hinge line, high above the ground, by remote, top-mounted latches. Such top-mounted latches are almost completely inaccessible and are not readily visible to operators on the ground. Several types of top-mounted latches attempt to solve the problem of inaccessibility by utilizing a remotely-actuated latch. These top-mounted latches commonly include a hook to engage the keeper. The hook is connected to, and actuated by, a push/pull cable which, in turn, is connected to a handle located at the bottom of the cowling near the ground. This allows an operator to remotely open and close the top-mounted latch from the ground by the use of the handle. When the top-mounted latch is remotely opened, the hook disengages from the keeper allowing the cowling to be opened. After closing the cowling, the top-mounted latch can be remotely closed by an operator simply toggling the handle at the bottom of the cowling.

A disadvantage of such remote latches is that if the hook or keeper are not in the proper position, or are broken, it may be possible to close the handle without the latch engaging the keeper. Other types of mechanical linkages and even electrical actuators have been used, instead of push/pull cables, to permit remote latches to be opened and closed from the ground, with the same aforementioned disadvantage.

A further disadvantage of the use of such remote latches is that there is no way for the mechanic to verify whether the hook has properly engaged the keeper from the ground. Therefore, the mechanic operating the remote latch can never be sure that the latch is properly closed. Various devices in conjunction with the previously described remote latches have been used, unsuccessfully, to verify that a top-mounted latch is properly closed. For example, previous attempts have been made to attach special devices to these remote latches to merely alert the mechanic if the latch has not properly engaged the keeper. These special devices do not prevent the latch from closing when the latch has not properly engaged the keeper. A disadvantage of utilizing these devices is that they are also subject to failure, damage, or human error.

In view of the above, it should be appreciated that there is a need for a latch assembly including sensor that prevents the latch from closing when the hook does not engage the keeper, as well as, alerts the latch assembly operator that the latch has not closed properly. The present invention satisfies these and other needs and provides further related advantages.

SUMMARY OF THE INVENTION

The invention resides in a latch assembly including sensor that provides advantages over known latches in that the latch assembly is prevented from closing when the latch does not engage a keeper, and the latch assembly alerts the operator that the latch assembly has not closed properly.

The latch assembly includes a latch housing and a latch, which is mounted in the latch housing. The latch includes a hook rotatably mounted within the latch housing. The hook includes a curved end, for engagement with a keeper, a base end, at the end of the hook opposite the curved end, and a central body located between the curved end and the base end. A channel extends from the top surface of the central body to the bottom surface of the central body and defines a pair of hook sidewalls. A pair of aligned slots in the central body extend through the hook sidewalls.

The latch also includes a linkage, that is moveable into and out of a locked position, and is rotatably mounted to the base end of the hook. The linkage includes a pair of compression links, which interface with the aligned slots in the hook sidewalls, and an elongated link, which is rotatably mounted to the base end of the hook and the compression links.

Furthermore, the latch includes a sensor, pivotally mounted to the hook by a sensor pivot pin with a spring coiled about the sensor pivot pin, that is moveable between a blocking position and an unblocking position. The sensor resided within a sensor slot located in the hook's curved end. The spring biases the sensor in the blocking position, where the sensor prevents the linkage from moving into the locked position and the latch assembly cannot be closed. In the unblocking position, the sensor is located away from the linkage allowing the linkage to move to the locked position.

Thus, when a latch assembly operator tries to move the linkage into the locked position, if the hook does not engage the keeper, thereby displacing the sensor, the sensor prevents the linkage from moving to the locked position and the latch assembly from closing. Because the latch assembly operator cannot move the linkage into the locked position, the operator is alerted that the hook is not properly engaged to the keeper and the latch assembly is not closed properly.

On the other hand, when the latch assembly operator moves the linkage into the locked position, if the hook engages the keeper, the keeper causes the sensor to rotate into its unblocking position away from the linkage. When the sensor is in its unblocking position, the linkage is allowed to move into its locked position and the latch assembly is allowed to close. Therefore, the latch assembly operator can move the linkage into the locked position and be assured that the hook has engaged the keeper and the latch assembly is properly closed.

Accordingly, the latch assembly including sensor alerts the latch operator as to whether or not the hook has engaged the keeper, and whether the latch assembly has closed properly, dependent upon whether the latch assembly operator can move the linkage into the locked position.

Other features and advantages of the present invention will be set forth in part in the description which follows and the accompanying drawings, wherein the preferred embodiments of the present invention are described and shown, and in part will become apparent to those skilled in the art upon examination of the following detailed description taken in conjunction with the accompanying drawings, or may be learned by practice of the present invention. The advantages of the present invention may be realized and attained by

DESCRIPTION OF THE PREFERRED EMBODIMENTS

Figure 1:
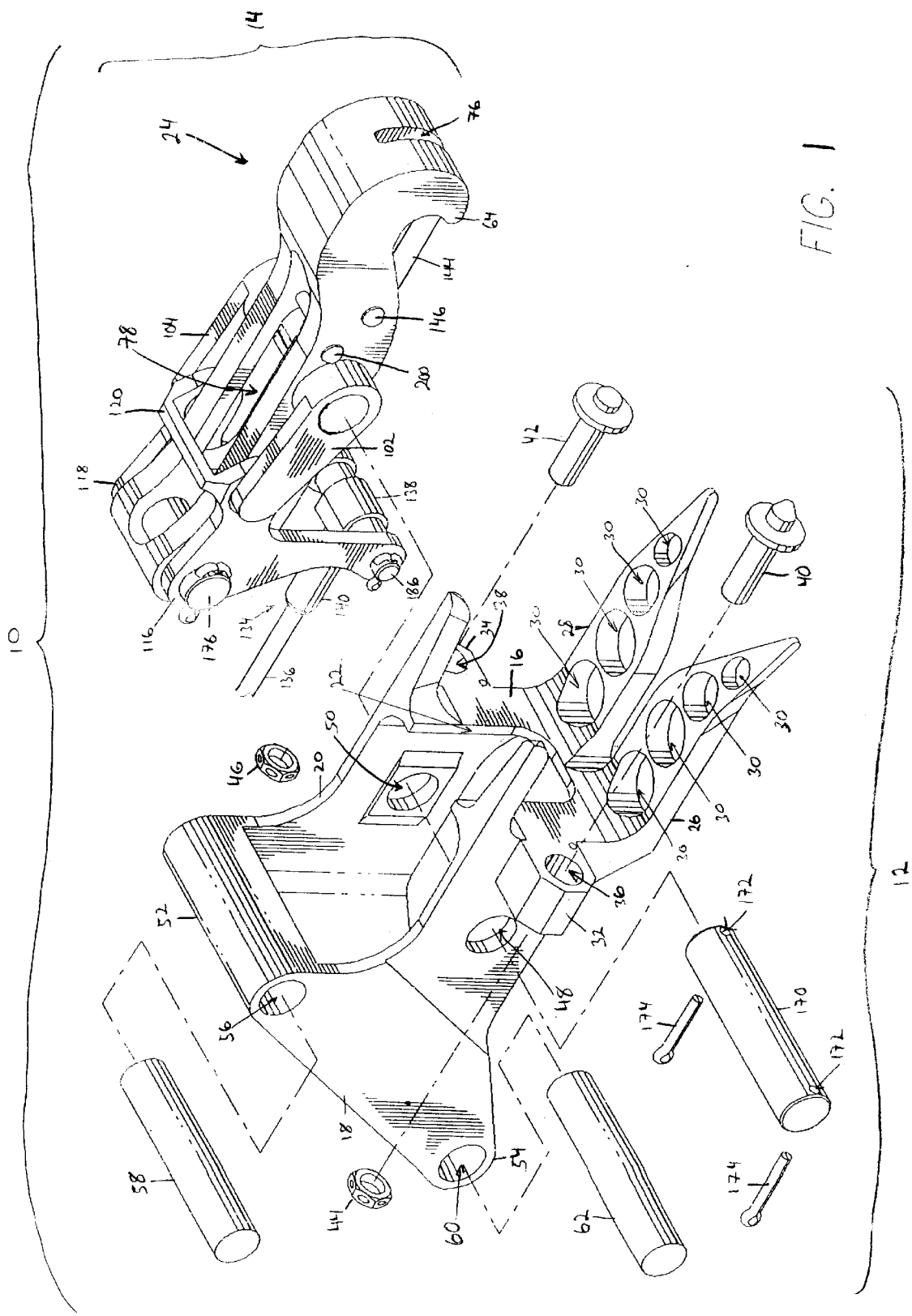
FIG. 1 is an exploded view of a latch assembly, particularly illustrating a latch housing.

The inventive latch assembly releasably engages a keeper for securing an aircraft panel to an aircraft structure. As shown in the exemplary drawings, and with particular reference to FIG. 1, the invention is embodied in a latch assembly 10 having a latch housing 12, and a latch 14 therein mounted for securing an aircraft panel (not shown), such as an aircraft cowling (not shown), to an aircraft structure (not shown). The latch housing has a generally U-shaped cross section formed by a front wall 16 and sidewalls 18 and 20 that are aligned parallel to each other, and perpendicular to the front wall. The front wall has a U-shaped latch notch 22 for accepting a hook 24. A pair of finger-shaped mounting tabs 26 and 28 extend perpendicularly from the front wall. The mounting tabs include a plurality of holes 30 for the receipt of fasteners (not shown) to mount the latch housing to the aircraft cowling (not shown).

Extending perpendicularly from each of the sidewalls 18 and 20, adjacent the front wall 16, are extensions 32 and 34, respectively. Each extension includes an extension bore 36 and 38, respectively, whose axis is disposed parallel to the sidewalls. Adjusting pins 40 and 42 are inserted through each extension bore, respectively, and adjusting nuts 44 and 46 are tightened onto each adjusting pin, respectively. Additionally, each sidewall has formed therethrough aligned pivot pin holes 48 and 50.

At the opposing ends of the sidewalls 18 and 20 are an upper mounting section 52, and a lower mounting section 54. The upper mounting section extends between the top portions of the sidewalls. An upper mounting bore 56 extends through the upper mounting section. An upper mounting pin 58 is positioned through the upper mounting bore securing the latch housing to an aircraft cowling (not shown). Similarly, a lower mounting section extends between the bottom portions of the sidewalls. A lower mounting bore 60 extends through the lower mounting section. A lower mounting pin 62 is positioned through the lower mounting bore securing the latch housing to an aircraft cowling.

Figure 2:
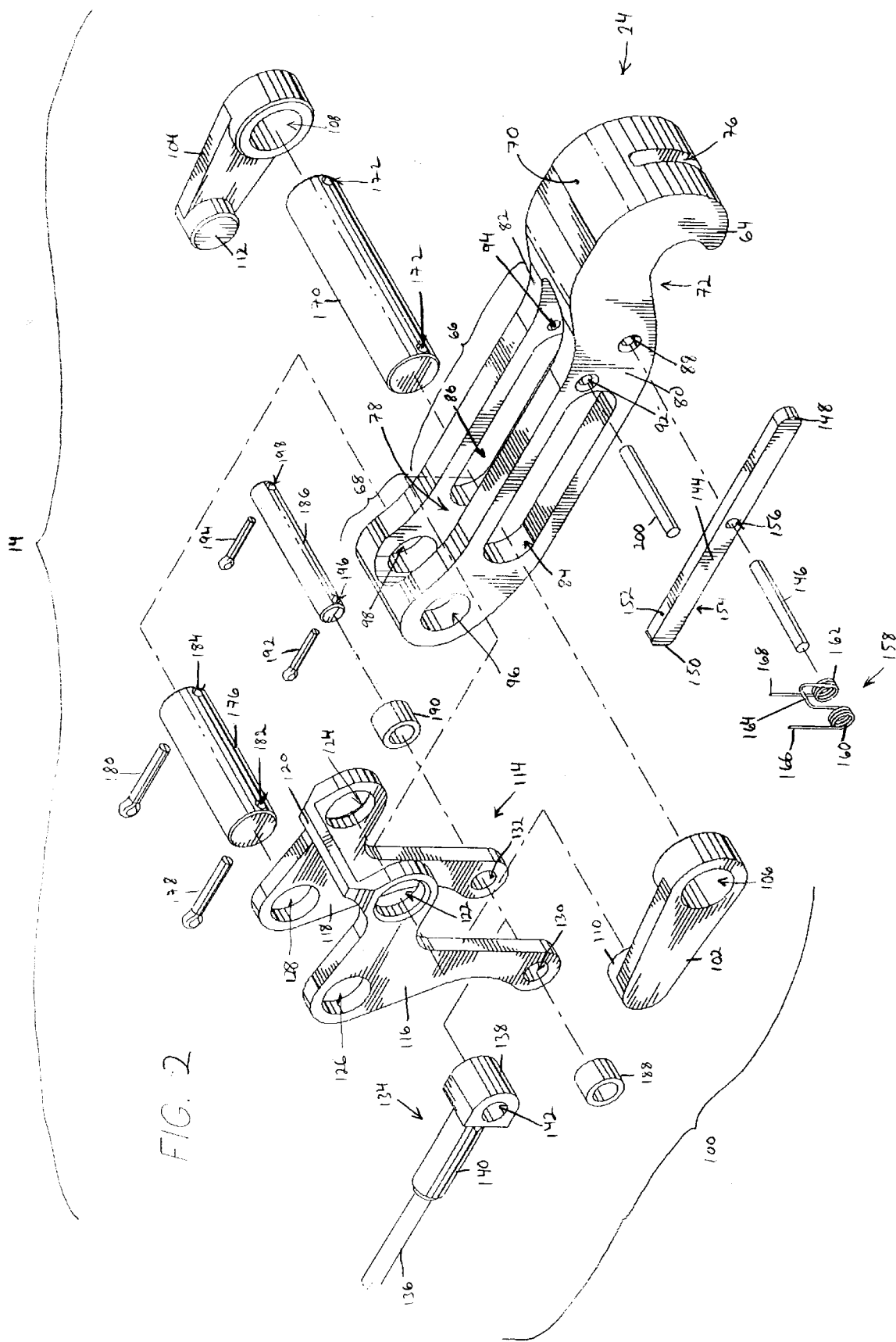
FIG. 2 is an exploded view of the latch assembly of FIG. 1, particularly illustrating a latch including; a hook, a linkage, and a sensor.
Figure 3A:
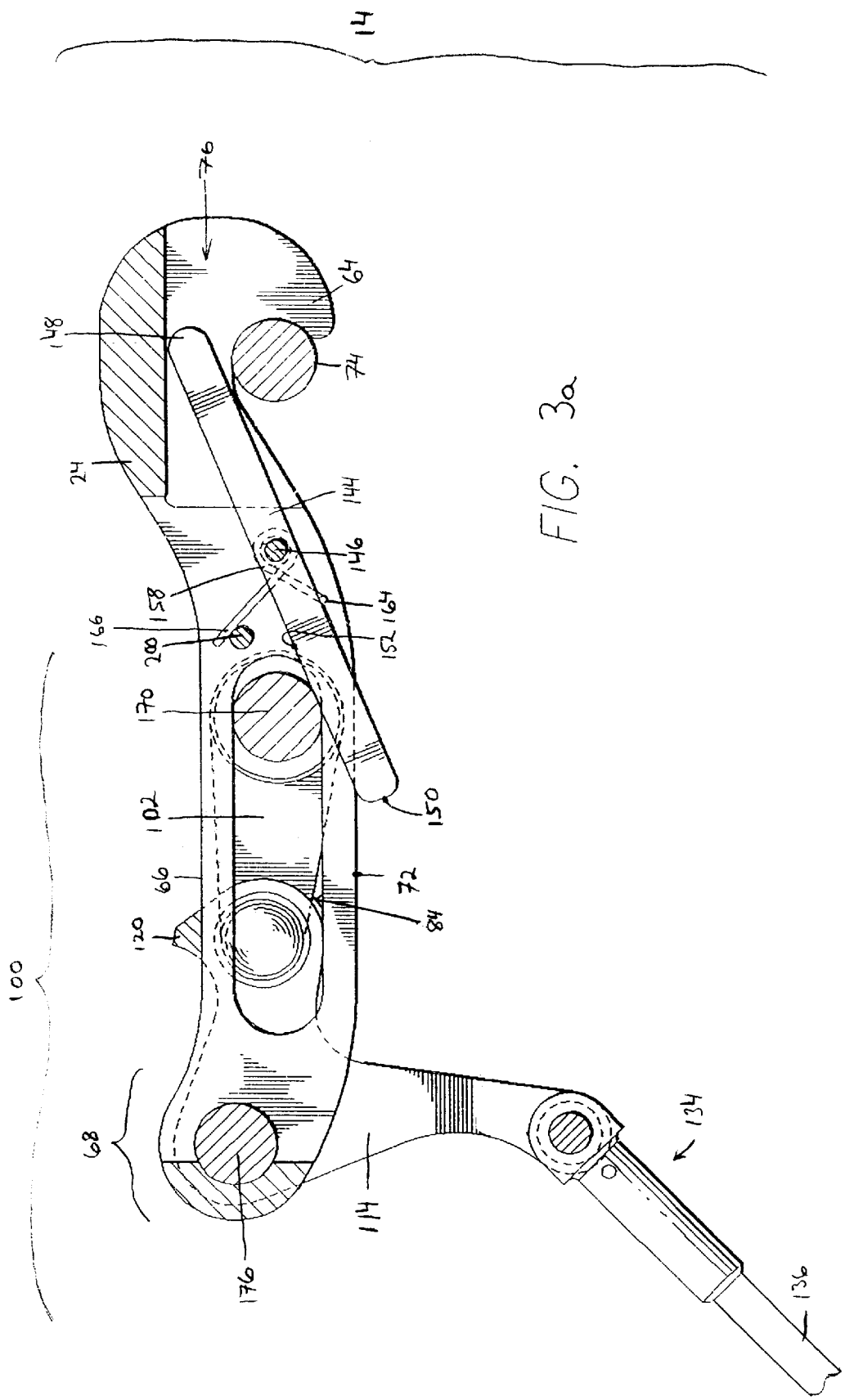
FIG. 3a is a sectional view of the latch of FIG. 1, illustrating the latch in a closed position with the hook engaged to a keeper and the sensor in an unblocking position.
Figure 3B:
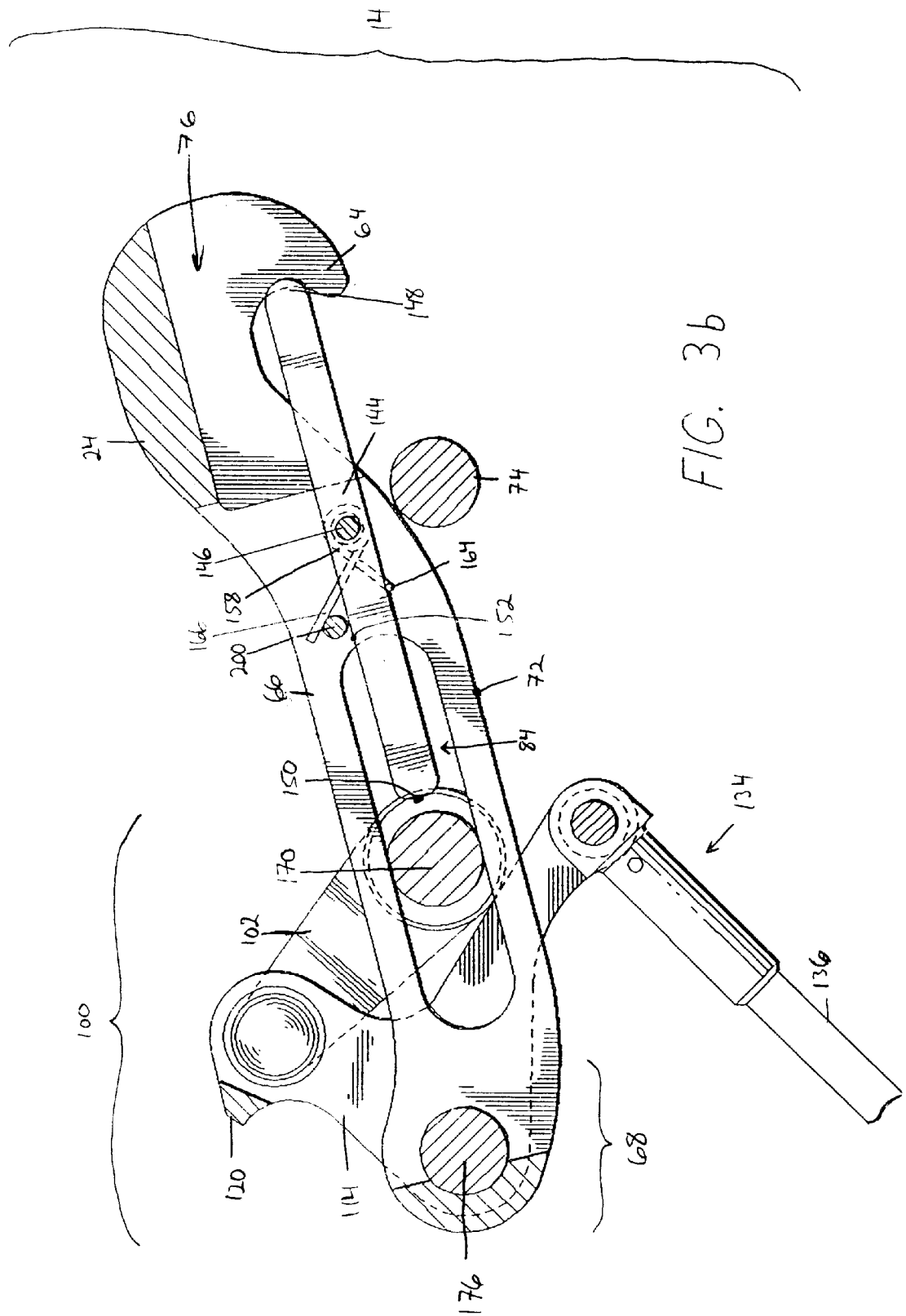
FIG. 3b is a sectional view of the latch of FIG. 1, illustrating the latch in its open position with the hook disengaged from the keeper.
Figure 3C:
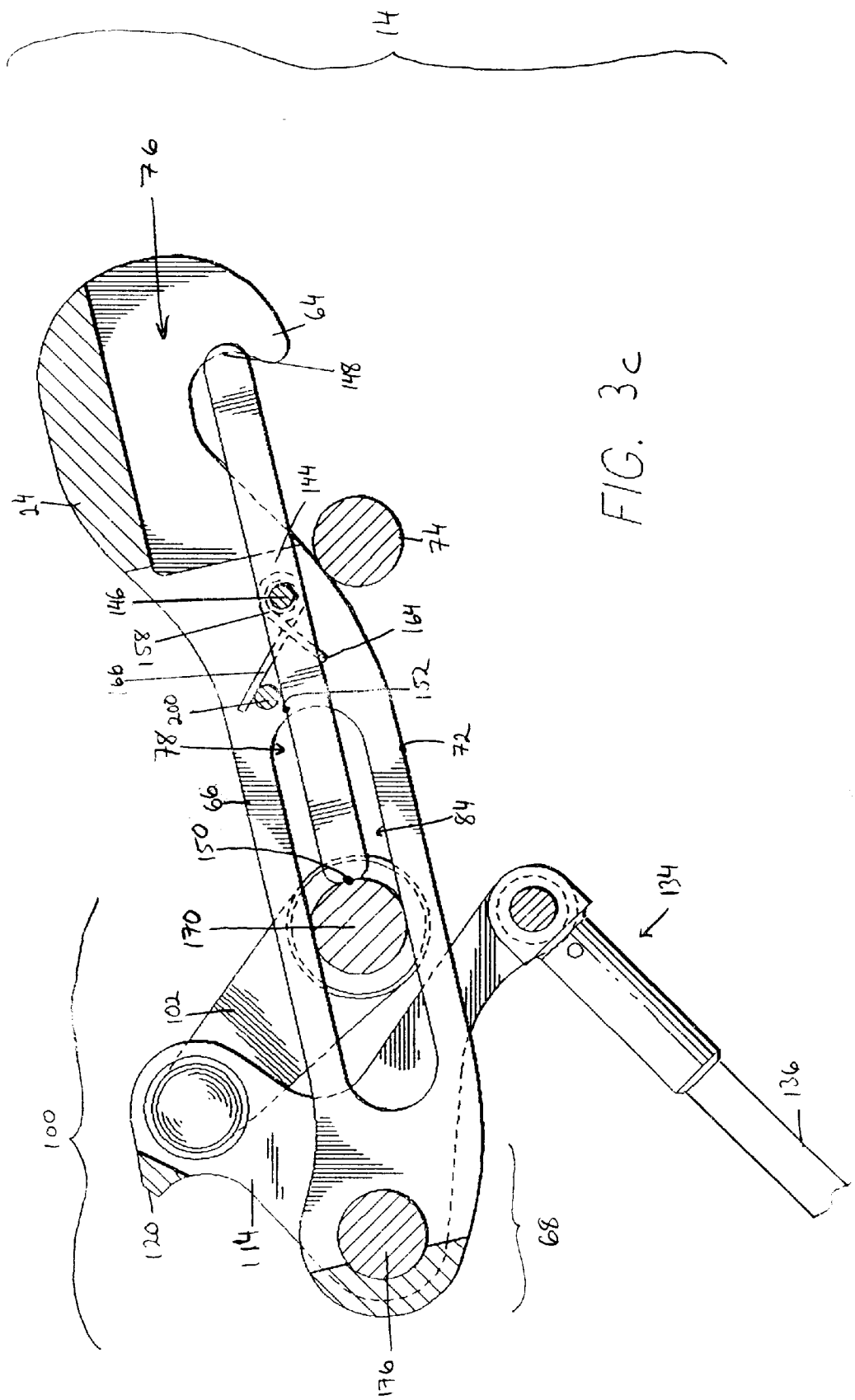
FIG. 3c is a sectional view of the latch of FIG. 1, illustrating the hook disengaged from the keeper and the linkage in contact with the sensor in its blocking position.

Referring additionally to FIG. 2, there is shown an exploded view of the latch 14. The latch includes a hook 24 which has a curved end 64, a central body 66, a base end 68, a hook top surface 70, and a hook bottom surface 72. As shown in FIGS. 3a, 3b, and 3c, the curved end facilitates engaging a keeper 74 and has a sensor slot 76 centered along its width. The sensor slot extends through the portion of the curved end which engages the keeper.

Returning to FIG. 2, the central body 66 of the hook 24 includes a central channel 78 which extends from the hook top surface 70 through to the hook bottom surface 72, and defines a pair of hook sidewalls 80 and 82. Also, the central body includes a pair of aligned slots 84 and 86. The aligned slots are formed therethrough the pair of hook sidewalls, respectively. The aligned slots are the same shape and dimension, and are situated parallel to each other across the central channel.

The central body 66 of the hook 24 includes a pair of aligned sensor pin holes 88 and 90 (only one shown) formed therethrough positioned between the aligned slots 84 and 86 and the curved end 64, respectively. The central body also includes a pair of aligned bias pin holes 92 and 94 formed therethrough positioned adjacent to the aligned slots. Also, the base end 68 of the hook includes a pair of aligned base holes 96 and 98 formed therethrough.

The latch 14 includes a linkage 100 designed to rotate the hook 24 into and out of engagement with the keeper 74 and to interface the hook to the latch housing 12. The linkage includes a pair of compression links 102 and 104 which are parallel to each other. Each compression link, at one end, includes an aligned link hole 106 and 108, respectively, and at the other end each link includes a cylindrical fitting 110 and 112, respectively.

The linkage 100 also includes an elongated link 114 made up of two V-shaped sidewalls 116 and 118 with an arm 120 connected therebetween. The V-shaped sidewalls of the elongated link are parallel to each other and are spaced apart by the arm. The arm connects the V-shaped sidewalls adjacent to the top of each of the V-shaped sidewalls. Each V-shaped sidewall includes aligned compression link mounting holes 122 and 124, respectively, adjacent to the arm, aligned base pin mounting holes 126 and 128, respectively, located at the base of each V-shaped sidewall, and aligned cable mounting holes 130 and 132, respectively, positioned at the lower ends of the V-shaped sidewalls furthest from the arm. The holes of the V-shaped sidewalls are aligned to facilitate the connection of the linkage to the hook 24.

The linkage 100 includes a cable fitting 134 which allows for the attachment of a push/pull cable 136 such that the latch 14 can be remotely operated. The cable fitting includes a semi-cylindrical head 138 and a shaft 140. The semi-cylindrical head of the cable fitting includes a cable fitting bore 142 disposed for attachment to the elongated link 114.

The latch 14 includes a sensor 144 pivotally mounted within the central body 66 of the hook 24 by a sensor pivot pin 146. The sensor is bar-shaped with a sensor end 148, a linkage surface end 150, a sensor top surface 152, a sensor bottom surface 154, and a central pivot hole 156. The sensor is biased toward a blocking position by a spring 158 coiled about the sensor pivot pin. The spring includes a first coil 160 and a second coil 162 which are coaxially positioned apart from each other so that the coils are located on either side of the sensor. The first coil and the second coil are held together by a U-shaped end 164. The other end of the coils, the first coil tail 166 and the second coil tail 168, are positioned parallel to each other.

As shown in FIGS. 1 and 2, a latch pivot pin 170 is inserted transversely through the aligned pivot pin holes 48 and 50 of the latch housing 12, the aligned link holes 106 and 108 of the compression links 102 and 104, and the aligned slots 84 and 86, and the central channel 78 of the hook 24. By this arrangement the compression links are slidably mounted to the hook, and both the hook and the linkage 100 are secured to the latch housing. At the ends of the latch pivot pin are cotter pin bores 172, which run radially through the latch pivot pin. The latch pivot pin is secured with cotter pins 174 that insert through the cotter pin bores exterior to the latch housing.

The cylindrical fittings 110 and 112 of the compression links 102 and 104 each fit within, and rotate within, the compression link mounting holes 122 and 124 of the elongated link 114, respectively (FIG. 2). Furthermore, a base pin 176 extends transversely through the aligned base pin mounting holes 126 and 128 of the elongated link, and through the aligned base holes 96 and 98 of the base end 68 of the hook 24, thereby rotatably mounting the elongated link to the hook.

The base pin 176 is fixed in place by a first base cotter pin 178 and a second base cotter pin 180 inserted radially through the first base cotter pin bore 182 at one end and a second base cotter pin bore 184 at the other end of the base pin, respectively. The first base cotter pin inserts through the first base cotter pin bore, adjacent to the V-shaped sidewall 116. Similarly, the second base cotter pin inserts through the second base cotter pin bore, adjacent to the V-shaped sidewall 118. The cotter pins are peened to secure the hook 24 to the elongated link 114.

A cable fitting pin 186 extends transversely through the aligned cable mounting holes 130 and 132 of the V-shaped sidewalls 116 and 118, respectively, a pair of bushings 188 and 190, and the cable fitting bore 142. Thus, the cable fitting pin locates the cable fitting 134 between the V-shaped sidewalls of the elongated link 114 with the bushings interposed between the cable fitting and the V-shaped sidewalls. The cable fitting pin is secured in place by a first cable cotter pin 192 and a second cable cotter pin 194. The cable fitting pin has a first cable cotter pin bore 196 and a second cable cotter pin bore 198, with the bores radially positioned at each end of the cable fitting pin. The first cable cotter pin inserts through the first cable cotter pin bore adjacent to the V-shaped sidewall 116, and the second cable cotter pin inserts through the second cable cotter pin bore adjacent to the V-shaped sidewall 118. The cotter pins are peened to secure the cable fitting to the elongated link.

The sensor pivot pin 146 extends transversely through the aligned sensor pin holes 88 and 90 of the hook 24, the first and second coils 160 and 162 of the spring 158, and the central pivot hole 156 of the sensor 144. Also, a bias pin 200 extends transversely through the aligned bias pin holes 92 and 94. The first coil tail 166 and the second coil tail 168 are positioned against the side of the bias pin nearest the curved end 64 (FIG. 3b). The U-shaped end 164 of the spring rests against the sensor's bottom surface 154. The arrangement of the sensor pivot pin, the spring, and the bias pin, urges the sensor toward a blocking position in which it is oriented parallel to the hook.

The method of use and operation of the latch assembly 10, constructed as described above, proceeds as follows. It shall be appreciated that FIGS. 3a, 3b, and 3c illustrate the operation of the latch assembly and are sectional views, and therefore, the description of operation as to the illustrated sectional view applies to the other corresponding half of the latch assembly.

FIG. 3a is a sectional view of the latch 14 in its closed position with the hook 24 engaged with a keeper 74 and illustrates the sensor 144 in the unblocking position. The force of the keeper pressing against the sensor causes the sensor to rotate counterclockwise about the sensor pivot pin 146 into its unblocking position overcoming the action of the spring 158. The counterclockwise rotation of the sensor causes the sensor's linkage surface end 150 to dip below the hook bottom surface 72.

As shown in FIG. 3a, when the latch 14 is closed, the linkage 100 is in its locked position with the latch pivot pin 170 positioned at the far end of the aligned slot 84 adjacent to the curved end 64. The compression link 102 is positioned approximately parallel to the aligned slot. The elongated link 114 is positioned about the base pin 176 such that the arm 120 is in close proximity with the central body 66 of the hook 24. In this configuration, the lower portion of the elongated link, connected to the push/pull cable 136, extends perpendicularly below the central body of the hook.

FIG. 3b shows the latch 14 in its open position. The latch assembly 10 can be opened by a latch assembly operator pushing a handle (not shown), connected to the latch assembly by the push/pull cable 136. The action of the push/pull cable moves the linkage 100 from the locked position of FIG. 3a to the unlocked position of FIG. 3b which, in turn, rotates the hook 24 out of engagement with the keeper 74 opening the latch. Since the keeper is not in contact with the sensor 144, the sensor is biased by the action of the spring 158 to the blocking position. In the blocking position, the sensor is generally parallel to the central body 66 of the hook, and the sensor end 148 is positioned within the sensor slot 76 of the curved end 64. The spring biases the sensor such that the sensor top surface 152 is in contact with the bias pin 200.

As shown in FIG. 3b, the latch pivot pin 170 is positioned slightly farther than the midpoint of the aligned slot 84 towards the base end 68 of the hook 24 such that the elongated link 114 is rotated counterclockwise from its position in FIG. 3a. In the configuration of FIG. 3b, the arm 120 is located away from the central body 66 of the hook, the compression link 102 and the elongated link are angled relative to the central body of the hook, and the push/pull cable 136 is drawn up in close proximity to the central body of the hook. After the latch assembly 10 has been opened, the aircraft cowling (not shown) can be pivoted open.

FIG. 3c shows the hook 24 disengaged from the keeper 74 and illustrates the sensor 144 in the blocking position. After the aircraft cowling (not shown) is closed, if a latch assembly operator pulls the handle (not shown) to the closed position, actuating the latch assembly 10 via the push/pull cable 136, and the hook does not engage the keeper, the sensor remains in the blocking position. The blocking position of the sensor prevents the linkage 100 from moving to the locked position of FIG. 3a and the latch 14 from closing.

In the blocking position, the linkage surface end 150 of the sensor 144 is within the central channel 78 of the hook 24, illustrated in FIG. 3c, and the sensor prevents the lateral movement of the latch pivot pin 170 within the aligned slot 84 towards the curved end 64 and the rotation of the elongated link 114 about the base pin 176. FIG. 3c particularly illustrates the latch pivot pin abutting the linkage surface end of the sensor. In this configuration, the latch 14 cannot be closed because the sensor prevents the latch pivot pin from moving the linkage 100 to the locked position of FIG. 3a. Therefore, the latch assembly operator cannot pull the handle (not shown) closed, and the push/pull cable 136 downward, to close the latch assembly 10. Because the latch assembly operator cannot pull the handle closed, the operator is alerted that the hook has not engaged to the keeper 74 and the latch assembly has not closed properly. On the other hand, as shown in FIG. 3*a,* when a latch assembly operator pulls the handle to the closed position, the operator can be assured that the hook has engaged the keeper and the latch assembly is properly closed.

Accordingly, the latch assembly 10 alerts the operator whether or not the hook 24 has engaged the keeper 74, and whether the latch assembly has closed properly, dependent upon whether the operator can close the handle (not shown). An additional advantage of the latch assembly is that the sensor 144 is relatively light in weight and simple in design.

Those skilled in the art will recognize that other modifications and variations can be made in the latch assembly including sensor of the invention and in the construction and operation of the latch assembly without departing from the scope or spirit of this invention. For example, it should be understood that this device could also be used to secure a variety of different panels to various types of structures. With such possibilities in mind, the invention is defined with reference to the following claims.

I claim:

1. A latch assembly including sensor operable by a push/pull cable for securing an aircraft panel to a keeper, the latch assembly comprising:
    a latch housing;
    a latch mounted in the latch housing, the latch including;
        a hook rotatably mounted within the latch housing;
        a curved end, at one end of the hook, for engagement with a keeper;
        a sensor slot located in the curved end;
        a base end at the end of the hook opposite the curved end;
        a central body located between the curved end and the base end of the hook;
        a linkage, moveable into and out of a locked position for preventing the curved end from disengaging from the keeper, rotatably mounted to the base end of the hook; and
        a sensor pivotally mounted to the hook by a sensor pivot pin with a spring coiled about the sensor pivot pin, the sensor moveable between a blocking position and an unblocking position, the spring biasing the sensor towards the blocking position such that, in the blocking position, the sensor prevents the linkage from moving to the locked position, and in the unblocking position, the sensor is located away from the linkage allowing the linkage to move to the locked position.

2. The latch assembly of claim 1, wherein the linkage includes a pair of compression links connected to an elongated link for connecting a push/pull cable.

3. The latch assembly of claim 2, wherein the hook has a channel which extends from the top surface of the central body to the bottom surface of the central body and defines a pair of hook sidewalls.

4. A latch assembly including sensor operable by a push/pull cable for securing an aircraft panel to a keeper, the latch assembly comprising:
    a latch housing;
    a latch mounted in the latch housing, the latch including;
        a hook rotatably mounted within the latch housing for engagement with a keeper;
        said hook having a curved end for engaging the keeper;
        a base end of said hook for pivotable connection to the linkage; and
        a central body between the curved end and the base end;
        a linkage displaceable along with the hook into and out of a locked position for preventing the hook from disengaging from the keeper, the linkage rotatably mounted to the hook;
        a sensor directly mounted on the hook, the sensor movable between a blocking position and an unblocking position such that, in the blocking position, the sensor prevents the linkage from moving to the locked position, and in the unblocking position, the sensor is located away from the linkage allowing the linkage to move to the locked position.

5. The latch assembly of claim 4, wherein the linkage includes a pair of compression links connected to an elongated link for connecting a push/pull cable.

6. The latch assembly of claim 4, wherein the linkage includes a pair of compression links connected to an elongated link for connecting a push/pull cable.

7. The latch assembly of claim 6, wherein the central body has a pair of aligned slots which extend through the pair of hook sidewalls and interface the pair of compression links.

8. The latch assembly of claim 4 further comprising a sensor pivot pin extending through the central body and through the sensor locating the sensor at least partially within the hook and pivotally mounting the sensor to the hook.

9. The latch assembly of claim 8 further comprising a spring coupled to the sensor pivot pin for biasing the sensor towards the blocking position.

10. A latch assembly including a sensor for securing an aircraft panel to a keeper; said latch assembly comprising;
    a latch housing;
    a latch operatively attached to the latch housing;
    a hook of the latch being pivotally connected to the latch housing for engagement with a keeper;
    a linkage of the latch movably connected to the hook;
        the linkage includes a pair of compression links connected to an elongated link from connecting a push/pull cable;
        the linkage being movable into a locked position from preventing the hook from disengaging from the keeper;
        the linkage being movable out of a locked position for disengaging the hook from the keeper;
    a sensor directly pivotally carried on said hook;
    the sensor being movable to a blocking position to prevent the linkage from moving to the locked position for engagement with a keeper;
    the sensor being movable to an unblocking position to allow the linkage to move to the locked position; and
    engagement of the hook with the keeper displaces the sensor from the linkage allowing the linkage to move to the locked position;
    the hook has a curved end for engaging the keeper;
    a sensor slot located in the curved end for receiving a portion of the sensor;
    a base end for pivotable connection to the linkage; and
    a central body located between the curved end and the base end.

11. The latch assembly of claim 10, wherein the hook has a channel which extends from the top surface of the central body to the bottom surface of the central body and defines a pair of hook sidewalls.

12. The latch assembly of claim 11, wherein the central body has pair of aligned slots which extend through the pair of hook sidewalls and interface the pair of compression links.

13. A latch assembly including a sensor for securing an aircraft panel to a keeper, said latch assembly comprising;
- a latch housing;
- a latch operatively attached to the latch housing;
- a hook of the latch being pivotally connected to the latch housing for engagement with a keeper;
- a linkage of the latch movably connected to the hook;
- the linkage being movable into a locked position for preventing the hook from disengaging from the keeper;
- the linkage being movable into a locked position for preventing the hook from disengaging from the keeper;
- the linkage being movable out of a locked position for disengaging the hook from the keeper;
- a sensor directly pivotally carried on said hook;
- the sensor being movable to a blocking position to prevent the linkage from moving to the locked position for engagement with a keeper;
- the sensor being movable to an unblocking position to allow the linkage to move to the locked position; and
- engagement of the hook with the keeper displaces the sensor from the linkage allowing the linkage to move to the locked position:
  - said hook has a curved end for engaging the keeper;
  - a sensor slot located in the curved end for receiving a portion of the sensor;
  - a base end for pivotable connection to the linkage;
  - a central body located between the curved end and the base end; and
  - a sensor pivot pin extending through the central body and through the sensor locating the sensor at least partially within the hook and pivotally mounting the sensor to the hook.

14. The latch assembly of claim 13 further comprising a spring coupled to the sensor pivot pin for biasing the sensor towards the blocking position.

15. A latch assembly including sensor operable by a push/pull cable for securing an aircraft panel to a keeper, the latch assembly comprising:
- a latch housing;
- a latch mounted in the latch housing, the latch including;
  - a hook rotatably mounted within the latch housing;
  - a curved end, at one end of the hook, for engagement with a keeper;
  - a sensor slot located in the curved end;
  - a base end at the end of the hook opposite the curved end;
  - a central body located between the curved end and the base end of the hook;
  - a channel which extends from the top surface of the central body to the bottom surface of the central body and defines a pair of hook sidewalls;
  - a pair of aligned slots, in the central body, which extend through the pair of hook sidewalls;
  - a linkage, moveable into and out of a locked position for preventing the curved end from disengaging from the keeper, rotatably mounted to the base end of the hook, including;
    - a pair of compression links that interface with the pair of aligned slots in the central body of the hook;
    - an elongated link, rotatably mounted to the base end of the hook and the pair of compression links, for connecting a push/pull cable; and
  - a sensor pivotally mounted to the hook by a sensor pivot pin with a spring coiled about the sensor pivot pin, the sensor moveable between a blocking position and an unblocking position, the spring biasing the sensor towards the blocking position such that, in the blocking position, the sensor prevents the linkage from moving to the locked position, and in the unblocking position, the sensor is located away from the linkage allowing the linkage to move to the locked position.

16. A latch assembly for securing an aircraft panel to a keeper, the latch assembly comprising:
- a latch housing;
- a latch mounted in the latch housing, the latch including;
  - a hook moveably mounted within the latch housing;
  - a curved end, at one end of the hook, for engagement with a keeper;
  - a sensor slot located in the curved end;
  - a base end at the end of the hook opposite the curved end;
  - a central body located between the curved end and the base end of the hook;
  - the hook has a channel which extends from the top surface of the central body to the bottom surface of the central body and defines a pair of hook sidewalls;
  - a linkage, moveable into and out of a locked position for preventing the curved end from disengaging from the keeper, rotatably mounted to the base end of the hook;
  - the linkage includes a pair of compression links connected to an elongated link for connecting a push/pull cable;
  - the central body has a pair of aligned slots which extend through the pair of hook sidewalls and interfaces the pair of compression links; and
  - a sensor pivotally mounted to the hook by a sensor pivot pin with a spring coiled about the sensor pivot pin, the sensor moveable between a blocking position and an unblocking position, the spring biasing the sensor towards the blocking position such that, in the blocking position, the sensor prevents the linkage from moving to the locked position, and in the unblocking position, the sensor is located away from the linkage allowing the linkage to move to the locked position.

17. A latch assembly including sensor operable by a push/pull cable for securing an aircraft panel to a keeper, the latch assembly comprising:
- a latch housing;
- a latch mounted in the latch housing, the latch including;
  - a hook rotatably mounted within the latch housing for engagement with a keeper;
  - a linkage displaceable along with the hook into and out of a locked position for preventing the hook from disengaging from the keeper, the linkage rotatably mounted to the hook;
  - a sensor directly mounted on the hook;
  - said sensor moveable between a blocking position and an unblocking position such that, in the blocking position, the sensor prevents the linkage from moving to the locked position, and in the unblocking position, the sensor is located away from the linkage allowing the linkage to move to the locked position; and
  - said sensor is pivotally mounted to the latch.

* * * * *